(12) United States Patent
Chen et al.

(10) Patent No.: US 9,255,226 B2
(45) Date of Patent: Feb. 9, 2016

(54) METHOD FOR IMPROVING FISCHER-TROPSCH SYNTHESIS AND RECYCLING EXHAUST GASES THEREFROM

(71) Applicant: Wuhan Kaidi Engineering Technology Research Institute Co., Ltd., Wuhan (CN)

(72) Inventors: Yilong Chen, Wuhan (CN); Kan Song, Wuhan (CN); Pingyu Kuai, Wuhan (CN); Yanfeng Zhang, Wuhan (CN); Jiaqi Jin, Wuhan (CN)

(73) Assignee: Wuhan Kaidi Engineering Technology Research Institute Co., Ltd., Wuhan (CN)

( * ) Notice: Subject to any disclaimer, the term of this patent is extended or adjusted under 35 U.S.C. 154(b) by 0 days.

(21) Appl. No.: 14/571,240

(22) Filed: Dec. 15, 2014

(65) Prior Publication Data

US 2015/0099813 A1 Apr. 9, 2015

Related U.S. Application Data

(63) Continuation-in-part of application No. PCT/CN2013/074719, filed on Apr. 25, 2013.

(30) Foreign Application Priority Data

Jun. 26, 2012 (CN) .......................... 2012 1 0213566

(51) Int. Cl.

| | |
|---|---|
| *C07C 1/04* | (2006.01) |
| *C10G 2/00* | (2006.01) |
| *B01D 53/047* | (2006.01) |
| *C10K 1/32* | (2006.01) |
| *C10K 3/00* | (2006.01) |
| *C01B 3/34* | (2006.01) |
| *C01B 3/56* | (2006.01) |

(52) U.S. Cl.
CPC ................ *C10G 2/40* (2013.01); *B01D 53/047* (2013.01); *C01B 3/34* (2013.01); *C01B 3/56* (2013.01); *C10G 2/332* (2013.01); *C10K 1/32* (2013.01); *C10K 3/00* (2013.01); *B01D 2257/108* (2013.01); *B01D 2257/7025* (2013.01); *C01B 2203/062* (2013.01); *Y02C 20/20* (2013.01)

(58) Field of Classification Search
CPC .............. C07C 1/04; C10G 2/00; C10G 2/32; C10G 2/33
USPC .................................................. 518/700–705
See application file for complete search history.

(56) References Cited

FOREIGN PATENT DOCUMENTS

| | | | |
|---|---|---|---|
| CN | 1304913 A | * | 7/2001 |
| CN | 101538483 A | * | 9/2009 |

* cited by examiner

*Primary Examiner* — Sudhakar Katakam
(74) *Attorney, Agent, or Firm* — Matthias Scholl P.C.; Matthias Scholl

(57) ABSTRACT

A method for improving Fischer-Tropsch synthesis and recycling exhaust gases therefrom. The method includes: 1) transforming raw gas for Fischer-Tropsch synthesis using a water-gas shift reaction, transporting the transformed raw gas to a Fischer-Tropsch synthesis device for Fischer-Tropsch synthesis in the presence of a Fe-based or Co-based catalyst; 2) introducing exhaust gases from the Fischer-Tropsch synthesis device to a first pressure-swing adsorber for hydrogen recovery; 3) introducing the exhaust gases from 2) to a second pressure-swing adsorber for methane recovery; 4) returning part of the hydrogen obtained from 2) to 1) to mix with the raw gas, and transforming a resulting mixed gas to adjust a hydrogen/carbon ratio of the raw gas; and 5) introducing the methane in 3) to a methane reforming device to reform the methane whereby yielding syngas having relatively high hydrogen/carbon ratio, and transporting the syngas to 1) to mix with the raw gas.

10 Claims, 1 Drawing Sheet

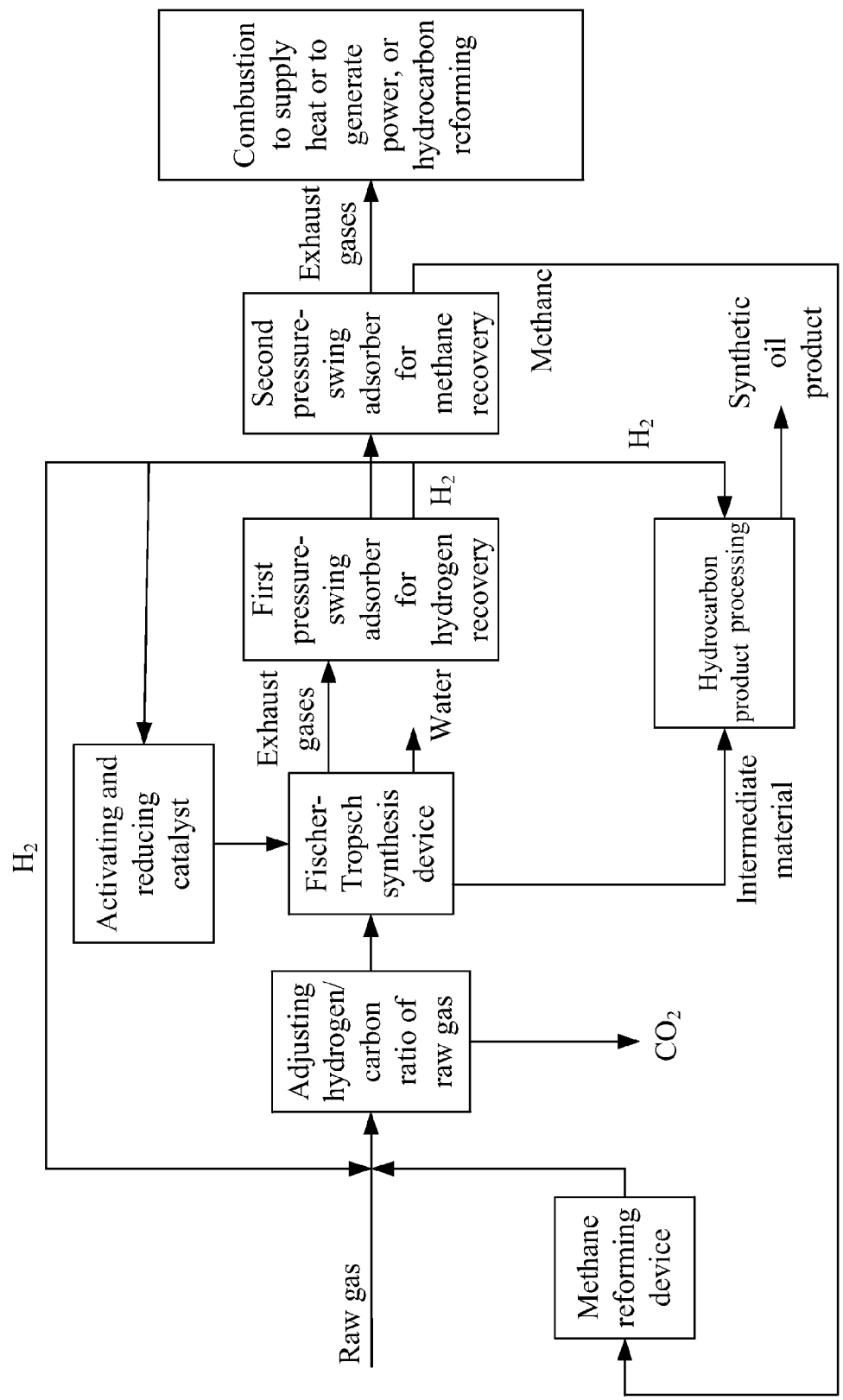

METHOD FOR IMPROVING FISCHER-TROPSCH SYNTHESIS AND RECYCLING EXHAUST GASES THEREFROM

CROSS-REFERENCE TO RELATED APPLICATIONS

This application is a continuation-in-part of International Patent Application No. PCT/CN2013/074719 with an international filing date of Apr. 25, 2013, designating the United States, now pending, and further claims priority benefits to Chinese Patent Application No. 201210213566.3 filed Jun. 26, 2012. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

1. Field of the Invention

The invention relates to a method for improving Fischer-Tropsch synthesis and recycling exhaust gases therefrom.

2. Description of the Related Art

The reforming procedure is a common step in the Fischer-Tropsch synthesis process. Specifically, the raw gas is required to be reformed through a water-gas shift reaction: $CO+H_2O \Longrightarrow CO_2+H_2$. However, the treated raw syngas still has low ratio of hydrogen to carbon, which cannot meet the requirement for Fischer-Tropsch synthesis. In general, the treatment load of the water-gas shift reaction is heavy, which increases the production costs and reduces the production efficiency. And in addition, the produced exhaust gases are directly discharged, resulting in pollution and waste.

SUMMARY OF THE INVENTION

In view of the above-described problems, it is one objective of the invention to provide a method for improving Fischer-Tropsch synthesis and recycling exhaust gases therefrom. The method can recycle hydrogen and methane from a Fischer-Tropsch synthesis device, reduce the carbon dioxide emissions and reduce the treatment load in the transformation procedure, thereby improving the production efficiency and economy of the entire system. The method is simple, highly efficient, and has low costs.

To achieve the above objective, in accordance with one embodiment of the invention, there is provided a method for improving Fischer-Tropsch synthesis and recycling exhaust gases therefrom, the method comprising:

1) transforming raw gas for Fischer-Tropsch synthesis using a water-gas shift reaction: $CO+H_2O \Longrightarrow CO_2+H_2$, transporting the transformed raw gas to a Fischer-Tropsch synthesis device for Fischer-Tropsch synthesis in the presence of a Fe-based or Co-based catalyst, controlling a reaction temperature of the Fischer-Tropsch synthesis at between 150 and 300° C. and a reaction pressure of between 2 and 4 MPa (A), to yield a liquid hydrocarbon product;
2) introducing exhaust gases from the Fischer-Tropsch synthesis device to a first pressure-swing adsorber for hydrogen recovery, and controlling a purity of the hydrogen at 80-99 vol. %;
3) introducing the exhaust gases from step 2) to a second pressure-swing adsorber for methane recovery, and controlling a purity of the methane at 80-95 vol. %;
4) returning part of the hydrogen obtained from step 2) to step 1) to mix with the raw gas, and transforming a resulting mixed gas to adjust a hydrogen/carbon ratio of the raw gas for Fischer-Tropsch synthesis; and
5) introducing the methane in step 3) to a methane reforming device to reform the methane to yield syngas having relatively high hydrogen/carbon ratio, transporting the syngas to step 1) to mix with the raw gas, and transforming a resulting mixed gas to adjust a hydrogen/carbon ratio of the raw gas.

In a class of this embodiment, 30-60 vol. % of the recycled hydrogen in step 2) is returned to step 1) to adjust the hydrogen/carbon ratio of the raw gas, 2-8 vol. % of the recycled hydrogen in step 2) is used to activate and reduce the catalyst, and the rest hydrogen is used to process the liquid hydrocarbon product.

In a class of this embodiment, the methane-removed exhaust gases in step 3) is introduced to a hydrocarbon reforming unit to function as a fuel or is directly used for combustion to supply heat or to generate power.

In a class of this embodiment, in step 2), the purity of the hydrogen is 85-95 vol. %.

In a class of this embodiment, the purity of the methane at 90-95 vol. %.

In a class of this embodiment, in step 5), a volume ratio of the hydrogen to carbon monoxide of the syngas after a methane reforming reaction is between 2 and 5.

In a class of this embodiment, in step 5), a volume ratio of hydrogen to carbon monoxide of the syngas after a methane reforming reaction is between 3 and 4.

Advantages according to embodiments of the invention are summarized as follows:

1. Hydrogen and methane are recycled from the exhaust gases of the Fischer-Tropsch synthesis device, thereby improving the production efficiency and carbon utilization rate;
2. The treatment load in the process of transformation of the raw gas is reduced, and the carbon dioxide emissions are decreased, which is environmentally friendly; and
3. Hydrogen recycled from the exhaust gases can be used for subsequent process of the liquid hydrocarbon product, which is economic.

BRIEF DESCRIPTION OF THE DRAWINGS

The invention is described hereinbelow with reference to accompanying drawings, in which the sole FIGURE is a flow chart of a method for improving Fischer-Tropsch synthesis and recycling exhaust gases therefrom.

DETAILED DESCRIPTION OF THE EMBODIMENTS

For further illustrating the invention, experiments detailing a method for improving Fischer-Tropsch synthesis and recycling exhaust gases therefrom are described below. It should be noted that the following examples are intended to describe and not to limit the invention.

The sole FIGURE is a flow chart of a method for improving Fischer-Tropsch synthesis and recycling exhaust gases therefrom.

The invention provides a method for improving Fischer-Tropsch synthesis and recycling exhaust gases therefrom, the method comprising:

1) transforming raw gas for Fischer-Tropsch synthesis using a water-gas shift reaction, transporting the transformed raw gas to a Fischer-Tropsch synthesis device for Fischer-Tropsch synthesis in the presence of a Fe-based or Co-based catalyst, controlling a reaction temperature of the Fischer-Tropsch synthesis at between 150 and 300° C. and a reaction pressure of between 2 and 4 MPa, to yield a liquid hydrocarbon product and water which is discharged out of the Fischer-Tropsch synthesis device;
2) introducing exhaust gases from the Fischer-Tropsch synthesis device to a first pressure-swing adsorber for hydrogen recovery, and controlling a purity of the hydrogen at 80-99 vol. %;
3) introducing the exhaust gases from step 2) to a second pressure-swing adsorber for methane recovery, and controlling a purity of the methane at 80-95 vol. %;
4) returning part of the hydrogen obtained from step 2) to step 1) to mix with the raw gas, and transforming a resulting mixed gas to adjust a hydrogen/carbon ratio of the raw gas for Fischer-Tropsch synthesis; and
5) introducing the methane in step 3) to a methane reforming device to reform the methane to yield syngas having relatively high hydrogen/carbon ratio, transporting the syngas to step 1) to mix with the raw gas, and transforming a resulting mixed gas to adjust a hydrogen/carbon ratio of the raw gas.

Preferably, 30-60 vol. % of the recycled hydrogen in step 2) is returned to step 1) to adjust the hydrogen/carbon ratio of the raw gas, 2-8 vol. % of the recycled hydrogen in step 2) is used to activate and reduce the catalyst, and the rest hydrogen is used to process the liquid hydrocarbon product.

The methane-removed exhaust gases in step 3) is introduced to a hydrocarbon reforming unit to function as a fuel or is directly used for combustion to supply heat or to generate power.

In step 2), the purity of the hydrogen is 85-95 vol. %.

Preferably, the purity of the methane at 90-95 vol. %.

Preferably, in step 5), a volume ratio of the hydrogen to carbon monoxide of the syngas after a methane reforming reaction is between 2 and 5.

Preferably, in step 5), a volume ratio of hydrogen to carbon monoxide of the syngas after a methane reforming reaction is between 3 and 4.

The heat energy or generated power is supplied for local areas or surrounding areas, to provide drive power for combustion turbines or steam turbines.

EXAMPLE 1

A biomass gasifier produces crude syngas with a production rate of 4000 Nm$^3$/h. The components of the crude syngas are listed in Table 1. The volume ratio of hydrogen/carbon monoxide is 0.39.

TABLE 1

Components of crude syngas

| Components | Vol. % |
|---|---|
| $H_2$ | 19 |
| CO | 49 |
| $CO_2$ | 24 |
| $CH_4$ | 2 |
| $N_2$ | 6 |

The reaction conditions of the Fischer-Tropsch synthesis are preset as follows:
1) The purity of the hydrogen from the first pressure-swing adsorber is 80 vol. %.
2) The purity of the methane from the second pressure-swing adsorber is 95 vol. %.
3) The reaction temperature of the Fischer-Tropsch synthesis is 190° C.
4) The reaction pressure of the Fischer-Tropsch synthesis is 2.1 MPa (A).

Based on the above preset reaction conditions, the main logistics data and performance parameters of the method are summarized as follows:
1) The volume ratio of hydrogen/carbon monoxide of the fresh syngas to be introduced to the Fischer-Tropsch synthesis device is 2.1, and the effective syngas ($H_2$+ CO) accounts for 90 vol. % of the total gas;
2) The production rate of the liquid hydrocarbon is 523 kg per hour, which is increased by 27% compared with conventional methods under the same working conditions in the absence of gas recycling;
3) 7.4 tons of carbon dioxide is discharged for producing every ton of liquid hydrocarbon, which is reduced by 24% compared with conventional methods under the same working conditions in the absence of gas recycling.

EXAMPLE 2

The applied crude syngas is the same as that in Example 1. The reaction conditions of the Fischer-Tropsch synthesis are preset as follows:
1) The purity of the hydrogen from the first pressure-swing adsorber is 90 vol. %.
2) The purity of the methane from the second pressure-swing adsorber is 90 vol. %.
3) The reaction temperature of the Fischer-Tropsch synthesis is 230° C.
4) The reaction pressure of the Fischer-Tropsch synthesis is 3.0 MPa (A).

Based on the above preset reaction conditions, the main logistics data and performance parameters of the method are summarized as follows:
1) The volume ratio of hydrogen/carbon monoxide of the fresh syngas to be introduced to the Fischer-Tropsch synthesis device is 2.3, and the effective syngas ($H_2$+ CO) accounts for 91 vol. % of the total gas;
2) The production rate of the liquid hydrocarbon is 500 kg per hour, which is increased by 33% compared with conventional methods under the same working conditions in the absence of gas recycling;
3) 7.8 tons of carbon dioxide is discharged for producing every ton of liquid hydrocarbon, which is reduced by 29% compared with conventional methods under the same working conditions in the absence of gas recycling.

EXAMPLE 3

The applied crude syngas is the same as that in Example 1. The reaction conditions of the Fischer-Tropsch synthesis are preset as follows:
1) The purity of the hydrogen from the first pressure-swing adsorber is 95 vol. %.
2) The purity of the methane from the second pressure-swing adsorber is 80 vol. %.

3) The reaction temperature of the Fischer-Tropsch synthesis is 250° C.
4) The reaction pressure of the Fischer-Tropsch synthesis is 3.5 MPa (A).

Based on the above preset reaction conditions, the main logistics data and performance parameters of the method are summarized as follows:
1) The volume ratio of hydrogen/carbon monoxide of the fresh syngas to be introduced to the Fischer-Tropsch synthesis device is 2.5, and the effective syngas ($H_2$+ CO) accounts for 92 vol. % of the total gas;
2) The production rate of the liquid hydrocarbon is 480 kg per hour, which is increased by 39% compared with conventional methods under the same working conditions in the absence of gas recycling;
3) 8.4 tons of carbon dioxide is discharged for producing every ton of liquid hydrocarbon, which is reduced by 31% compared with conventional methods under the same working conditions in the absence of gas recycling.

EXAMPLE 4

The applied crude syngas is the same as that in Example 1. The reaction conditions of the Fischer-Tropsch synthesis are preset as follows:
1) The purity of the hydrogen from the first pressure-swing adsorber is 80 vol. %.
2) The purity of the methane from the second pressure-swing adsorber is 80 vol. %.
3) The reaction temperature of the Fischer-Tropsch synthesis is 210° C.
4) The reaction pressure of the Fischer-Tropsch synthesis is 2.5 MPa (A).

Based on the above preset reaction conditions, the main logistics data and performance parameters of the method are summarized as follows:
1) The volume ratio of hydrogen/carbon monoxide of the fresh syngas to be introduced to the Fischer-Tropsch synthesis device is 2.5, and the effective syngas ($H_2$+ CO) accounts for 89 vol. % of the total gas;
2) The production rate of the liquid hydrocarbon is 474 kg per hour, which is increased by 37% compared with conventional methods under the same working conditions in the absence of gas recycling;
3) 8.3 tons of carbon dioxide is discharged for producing every ton of liquid hydrocarbon, which is reduced by 32% compared with conventional methods under the same working conditions in the absence of gas recycling.

EXAMPLE 5

The applied crude syngas is the same as that in Example 1. The reaction conditions of the Fischer-Tropsch synthesis are preset as follows:
1) The purity of the hydrogen from the first pressure-swing adsorber is 99 vol. %.
2) The purity of the methane from the second pressure-swing adsorber is 95 vol. %.
3) The reaction temperature of the Fischer-Tropsch synthesis is 220° C.
4) The reaction pressure of the Fischer-Tropsch synthesis is 2.3 MPa (A).

Based on the above preset reaction conditions, the main logistics data and performance parameters of the method are summarized as follows:
1) The volume ratio of hydrogen/carbon monoxide of the fresh syngas to be introduced to the Fischer-Tropsch synthesis device is 2, and the effective syngas ($H_2$+CO) accounts for 89 vol. % of the total gas;
2) The production rate of the liquid hydrocarbon is 517 kg per hour, which is increased by 23% compared with conventional methods under the same working conditions in the absence of gas recycling;
3) 7.6 tons of carbon dioxide is discharged for producing every ton of liquid hydrocarbon, which is reduced by 20% compared with conventional methods under the same working conditions in the absence of gas recycling.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method of producing liquid hydrocarbons through Fischer-Tropsch synthesis, the method comprising:
   1) subjecting a first syngas output from a biomass gasifier to a water-gas shift reaction and transforming part of CO in the first syngas to $CO_2$ and $H_2$ in the presence of water to yield a second syngas, reducing a Fe-based or Co-based catalyst to yield an activated catalyst, introducing the activated catalyst into a Fischer-Tropsch reactor, transporting the second syngas to the Fischer-Tropsch reactor for Fischer-Tropsch synthesis in the presence of the activated catalyst, and controlling a reaction temperature of the Fischer-Tropsch synthesis at between 150 and 300° C. and at a reaction pressure of between 2 and 4 MPa (A), to yield a liquid hydrocarbon product and a first exhaust gas;
   2) introducing the first exhaust gas to a first pressure-swing adsorber to recover hydrogen gas from the first exhaust gas, obtaining hydrogen gas having a purity of 80-99 vol. % and a second exhaust gas, and dividing the hydrogen gas into three feeds;
   3) introducing the second exhaust gas to a second pressure-swing adsorber to recover methane from the second exhaust gas, and obtaining methane having a purity of 80-95 vol. % and a third exhaust gas;
   4) introducing methane to a methane reforming device, reforming methane in the methane reforming device to yield a third syngas;
   5) returning the third syngas in step 4) and a first feed of the three feeds obtained in step 2) to step 1) to mix with the first syngas and to adjust a hydrogen/carbon ratio of the first syngas, and obtaining a fourth syngas; and
   6) returning a second feed of the three feeds obtained in step 2) to step 1) to reduce the Fe-based or Co-based catalyst.

2. The method of claim 1, wherein 30-60 vol. % of the hydrogen gas obtained in step 2) is returned to step 1) to mix with the first syngas, 2-8 vol. % of the hydrogen gas obtained in step 2) is used to reduce the Fe-based or Co-based catalyst, and a third feed of the three feeds obtained in step 2) is used to react with the liquid hydrocarbon product to yield a synthetic oil product.

3. The method of claim 2, wherein the third exhaust gas in step 3) is introduced to a hydrocarbon reforming unit to function as a fuel or is used for combustion.

4. The method of claim 2, wherein in step 2), the purity of the hydrogen gas is 85-95 vol. %.

5. The method of claim 2, wherein in step 3), the purity of methane is 90-95 vol. %.

6. The method of claim 2, wherein in step 5), a volume ratio of the hydrogen to carbon monoxide in the fourth syngas is between 2 and 5.

7. The method of claim 2, wherein in step 5), a volume ratio of hydrogen to carbon monoxide in the fourth syngas is between 3 and 4.

8. The method of claim 4, wherein in step 3), the purity of methane is 90-95 vol. %.

9. The method of claim 4, wherein in step 5), a volume ratio of hydrogen to carbon monoxide in the fourth syngas is between 3 and 4.

10. The method of claim 5, wherein in step 5), a volume ratio of the hydrogen to carbon monoxide in the fourth syngas is between 3 and 4.

\* \* \* \* \*